W. L. LONG.
PIPE PATCH.
APPLICATION FILED MAR. 6, 1919. RENEWED APR. 15, 1921.
1,388,731.
Patented Aug. 23, 1921.
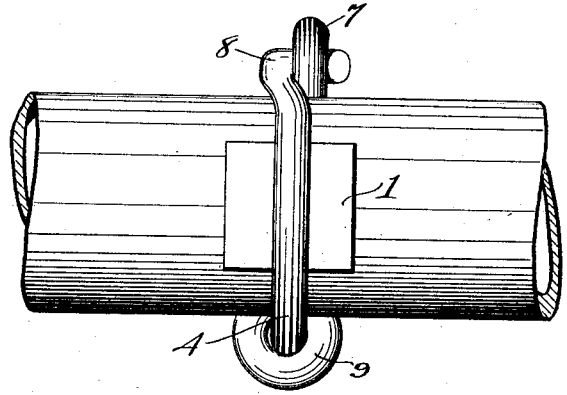
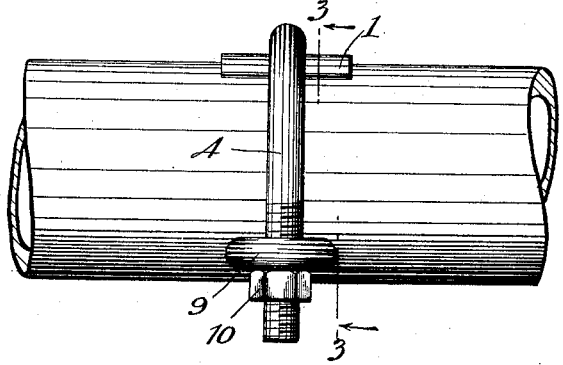
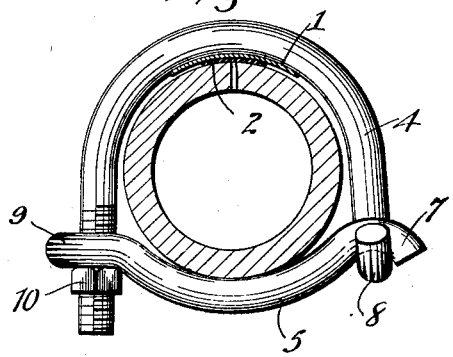
WITNESSES
INVENTOR
WILLIAM LOUIS LONG
BY
ATTORNEYS

UNITED STATES PATENT OFFICE.

WILLIAM LOUIS LONG, OF COFFEYVILLE, KANSAS.

PIPE-PATCH.

1,388,731.  Specification of Letters Patent.  Patented Aug. 23, 1921.

Application filed March 6, 1919, Serial No. 280,890. Renewed April 15, 1921. Serial No. 461,675.

*To all whom it may concern:*

Be it known that I, WILLIAM LOUIS LONG, a citizen of the United States, and a resident of Coffeyville, in the county of Montgomery and State of Kansas, have invented a new and Improved Pipe-Patch, of which the following is a full, clear, and exact description.

The present invention has for an object to provide an improved pipe patch for repairing leaks in gas and water pipes.

Reference is to be had to the accompanying drawings forming part hereof, in which—

Figure 1 is a top plan view of a pipe patch constructed in accordance with my invention applied to a section of a pipe;

Fig. 2 is a side view of the same; and

Fig. 3 is a sectional view taken on the line 3—3 of Fig. 2 looking in the direction of the arrows.

In the example shown, a patch plate 1 with a gasket 2 is applied over a hole in a pipe, as indicated in Fig. 3. The plate and gasket are held in place by means of a clamp comprising a yoke 4 and a presser bar 5 designed to hold the plate and gasket firmly in position against the pipe. The yoke shown consists of a round bar bent to U shape and being of a width and curvature such that when applied to a pipe the gasket-engaging U-shaped part will be substantially concentric with the pipe to which the gasket is applied.

Preferably the presser member 5 is curved at one end to form a hook 7 and engages a corresponding hook 8 upon one end of the U-shaped yoke, the other end of the presser bar being formed to provide an eye 9 which receives the corresponding threaded end of the yoke and is adjusted to and held in clamping position by means of a nut 10. The nut thus operates with a leverage which is substantially 2:1 as it is tightened to secure the patch in operative position.

As shown, the hooks 7 and 8 are relatively short so that they may be hooked into engaging position when applying the clamp. This construction is preferable to one in which one of the hooks is made in the form of a complete eye, therefore the hook 8 causing the application of the clamp is more readily engaged.

The plate 1 is of rigid material and is preferably made permanently of a curvature conforming substantially to the curvature of a pipe of the size to which it is designed to be applied.

Having thus described my invention, I claim as new and desire to secure by Letters Patent:

1. In an attachable pipe patch of the character described, the combination with a curved patch plate and the gasket of a clamp comprising a U-shaped yoke having a hook at one end and threaded at its opposite end, a presser bar having a hook for engagement with the hook of the yoke, and an eye to receive the threaded end of the yoke, with a nut for holding said eye in adjusted position.

2. In an attachable pipe patch of the character described, the combination with a curved patch plate and the gasket of a clamp comprising a U-shaped yoke and a coöperating presser bar being interengaged at one end, the presser bar having an eye at its opposite end receiving a threaded end of the yoke, and a nut holding said eye in position on the yoke.

WILLIAM LOUIS LONG.